(12) United States Patent
Brereton et al.

(10) Patent No.: US 8,305,046 B2
(45) Date of Patent: Nov. 6, 2012

(54) CHARGER PROTECTION CIRCUITRY FOR A RECHARGEABLE BATTERY

(75) Inventors: Richard Peter Brereton, Bournemouth (GB); Matthew Bennett, Bournemouth (GB)

(73) Assignee: PG Drives Technology Limited, Christchurch, Dorset (GB)

( * ) Notice: Subject to any disclaimer, the term of this patent is extended or adjusted under 35 U.S.C. 154(b) by 288 days.

(21) Appl. No.: 12/632,459

(22) Filed: Dec. 7, 2009

(65) Prior Publication Data

US 2010/0171468 A1 Jul. 8, 2010

(30) Foreign Application Priority Data

Jan. 7, 2009 (GB) .................................. 0900205.6

(51) Int. Cl.
*H02J 7/06* (2006.01)
*H02J 7/24* (2006.01)
(52) U.S. Cl. ........................ 320/163; 320/165
(58) Field of Classification Search ................... 320/163
See application file for complete search history.

(56) References Cited

U.S. PATENT DOCUMENTS

| | | | | |
|---|---|---|---|---|
| 3,686,549 A * | 8/1972 | Winebrener | ................. | 318/139 |
| 5,698,966 A | 12/1997 | Chen | | |
| 6,445,086 B1 * | 9/2002 | Houston | ........................ | 307/24 |
| 2002/0125865 A1 * | 9/2002 | Buchanan | ..................... | 323/274 |
| 2004/0217733 A1 | 11/2004 | Liu et al. | | |
| 2006/0108982 A1 * | 5/2006 | Daou et al. | .................... | 320/116 |
| 2009/0009008 A1 * | 1/2009 | Heinrich | ........................ | 307/112 |

OTHER PUBLICATIONS

UK Search Report Under Section 17(5), Intellectual Property Office, Application No. GB0900205.6, Apr. 24, 2009, pp. 1-3.

* cited by examiner

*Primary Examiner* — Arun Williams
(74) *Attorney, Agent, or Firm* — Haynes Beffel & Wolfeld LLP

(57) ABSTRACT

The present invention provides charger protection circuitry for a rechargeable battery, and a method of protecting a charger cable during charging of a rechargeable battery. A switch controller is used to turn a switch element on and off in dependence on a direction of current flow through the charger protection circuitry during charging and otherwise. If current is flowing in the first direction the switch controller turns on the switch element such that the auxiliary current tripping element is bypassed, whereby the main current tripping element controls interruption of current flow. If instead current is flowing in a second direction opposite to the first direction, the switch controller turns off the switch element, whereby the auxiliary current tripping element is connected into the current flow path to control interruption of current flow.

20 Claims, 6 Drawing Sheets

CHARGER PROTECTION CIRCUITRY FOR A RECHARGEABLE BATTERY

RELATED APPLICATION

This application claims priority to United Kingdom Application No. 0900205.6 filed 7 Jan. 2009. This foreign application is incorporated by reference.

FIELD OF THE INVENTION

The present invention relates to charger protection circuitry for a rechargeable battery.

BACKGROUND OF THE INVENTION

Rechargeable batteries are used in a variety of devices. For example, they may be used in small, handheld, devices, such as mobile phones, laptops, etc. In addition, rechargeable batteries may be used in larger devices, for example battery powered vehicles such as electric scooters and electric wheelchairs.

Wherever rechargeable batteries are used, it is common to provide a charger connection point for connecting a charger to the device in which the rechargeable battery is used, to enable the rechargeable battery to be recharged. At least a portion of the wiring from the charger to the battery will be provided externally to the device, and accordingly can be vulnerable to damage. For example, considering a simple device where the charger is connected via a charging lead directly to a charger connection point in the housing of the device, then the charging lead itself is potentially vulnerable to damage. Considering the example of a battery powered vehicle, then it is often not only the charging lead from the charger to the charger connection point that is potentially vulnerable to damage, but in addition there may be at least one lead on the battery powered vehicle itself passing from the charger connection point to the battery or some intermediate unit, that may also be vulnerable to damage.

For example, within a battery powered vehicle, it is common for multiple separate circuits to be driven from the rechargeable battery under the control of a power control system. A separate cable spur may be provided from the power control system to the charger connection point and at least part of that separate cable spur may run along an exposed surface of the vehicle. In an alternative embodiment, a common power line may be run from the power control system to a control input module which also incorporates the charger connection point. Hence, charging may occur via this common power line, but in addition power can be drawn down this common power line to power the control input module. Again, this common power line may run at least partially along an external surface of the vehicle. As a specific example, the control input module may take the form of a joystick mounted, for example, on an armrest of an electric wheelchair, and in that instance the common power line may run along the underside of the armrest and then be routed onward to the power control system within the wheelchair (typically mounted somewhere underneath the seat of the wheelchair).

Irrespective of how the wiring is provided from the charger to the battery, or to an intermediate unit such as a power control system (this wiring being referred to hereafter as the "charger cable"), that charger cable needs to be able to allow charging currents to be passed through the wires in order to charge the battery. For battery powered vehicles, the charging current may be in the magnitude of 10 amps. It is common to provide a current tripping element along the current charging path in order to limit the charging current, and for example such a current tripping element may be formed by one or more solid-state self-resetting fuses. Such solid-state self-resetting fuses are very reliable and have a high thermal mass that allows higher peak currents for shorter periods thereby avoiding false trips.

However, it is possible for the charger cable to become damaged and for shorts to occur between the positive and negative supply lines in the cable. The shorting can be caused for a variety of reasons, for example due to damaged cable insulation caused by vibration and abrasion, or by direct mechanical action as can be common in mobile vehicles. A direct short circuit will cause enough current out of the batteries for the self-resetting protection fuses to operate rapidly and prevent excess current flow. However, if the short is where the wires only just touch together, or short intermittently, the high initial surge of current available before the fuses trip can, under certain conditions, cause the wires to melt at the point of contact causing a high temperature plasma arc whose behaviour is difficult to predict.

Rarely, following repeated intermittent shorting, a self-sustaining arc may occur that has enough resistance to keep the current below the trip threshold of the protection fuses. For example, as mentioned earlier, in mobile vehicles, these protection fuses may allow current up to 10 amps to flow without tripping. This arc could potentially lead to a highly undesirable cable loom fire.

One possible way to prevent the above problem would be to provide a simple diode within the charger cable. Positive charging currents would then be allowed, but reverse currents from the battery would be inhibited. However, one problem with this solution is that the forward voltage drop of the diode will cause a significant amount of local heat dissipation to occur, which is undesirable. Further, modern intelligent battery chargers often need to draw some reverse current from the battery in order to read the battery voltage correctly. Furthermore, in some devices, for example battery powered vehicles, the charger cable forms a shared power line with other circuits, for example a control input module, and those other circuits need to be able to draw current from the battery (in the opposite direction to the current flow that occurs during charging) in order to power those circuits.

Accordingly, it would be desirable to provide an improved technique for protecting against the shorting problems that can occur when a charger cable becomes damaged.

SUMMARY OF THE INVENTION

Viewed from a first aspect, the present invention provides charger protection circuitry for a rechargeable battery, the charger protection circuitry for coupling between the rechargeable battery and a battery charger, during a charging operation of the battery charge current being arranged to flow through the charger protection circuitry in a first direction, the charger protection circuitry comprising: a main current tripping element for interrupting current flow if the current reaches a first predetermined level; a switch element; an auxiliary current tripping element connected in parallel with the switch element for interrupting current flow if the current reaches a second predetermined level lower than the first predetermined level; and a switch controller for turning the switch element on and off in dependence on a direction of current flow through the charger protection circuitry; if current is flowing in said first direction the switch controller being arranged to turn on the switch element such that said auxiliary current tripping element is bypassed, whereby the main current tripping element controls interruption of current flow; and if current is flowing in a second direction opposite to said first direction the switch controller being arranged to turn off the switch element, whereby the auxiliary current tripping element controls interruption of current flow.

In accordance with the present invention, in addition to a main current tripping element, an auxiliary current tripping element is connected in parallel with a switch element to allow that auxiliary current tripping element to be selectively placed within the current flow path. In particular, a switch controller is used to turn the switch element on and off in dependence on a direction of current flow through the charger protection circuitry. Thus, if current is flowing in a first direction as would occur when charge current is being supplied to the battery during a charging operation, the switch controller controls the switch so as to bypass the auxiliary current tripping element. As a result, during a charging operation, only the main current tripping element is used to determine whether the current flow should be interrupted, and accordingly the charger protection circuitry of the present invention allows positive charging current to be maintained without the losses that would arise if a diode was placed in the current flow path.

In contrast, if current is flowing in a second direction opposite to the first direction, the switch controller controls the switch element such that the auxiliary current tripping element is located within the current flow path. The auxiliary current tripping element has a current threshold less than that of the main current tripping element, and as a result this limits the output current that can flow in the second direction. Thus, whilst allowing some output current to be drawn in the second direction (for the legitimate reasons discussed earlier), the present invention can be arranged to ensure that unexpected output currents in the second direction cause the auxiliary tripping element to interrupt the current flow, thereby reducing the risk of a self-sustaining arc occurring, and, if a self-sustaining arc does form, alleviating the risk of it drawing current sufficient to initiate a cable loom fire.

Hence, the invention provides a low impedance switch mechanism that allows positive charging current to be passed with minimal losses, whilst only allowing a limited output current to be passed in the opposite direction, for example to ensure correct operation of the charger, to power any modules also utilising the charger cable, etc. The limited output current and power protects against cable shorts and eliminates potential cable fires that might otherwise result from intermittent or partial shorting.

When describing the charger protection circuitry as being coupled between the rechargeable battery and the battery charger, it will be appreciated that there is no requirement for the charger protection circuitry to be connected directly to either the rechargeable battery or the battery charger. Indeed, in some embodiments, there will be at least one intervening unit between the charger protection circuitry and the battery charger and between the charger protection circuitry and the rechargeable battery. For example, when considering a motorised vehicle including such charger protection circuitry, it will often be the case that an input control module will be located between the charger and the charger protection circuitry, and further it is likely that a power control system will be interposed between the charger protection circuitry and the rechargeable battery. The charger protection circuitry serves to protect the charger cable, the charger cable being the entirety of the cable extending from the charger to the charger protection circuitry irrespective of whether there is any intervening module provided along that path.

In one embodiment, if no current is flowing through the charger protection circuitry, the switch controller is arranged to turn off the switch element. In such embodiments, it is hence the case that in the absence of any current the auxiliary current tripping element is located within the current flow path. This hence improves resilience to current surges by ensuring that any sudden occurrence of current flow will be interrupted as soon as it reaches the second predetermined level associated with the auxiliary current tripping element.

The switch element may be constructed in a variety of ways. However, in one embodiment the switch element comprises a field effect transistor (FET) whose gate is connected to an output of the switch controller. If the FET was left undriven, it would operate as a parasitic diode, allowing the charge current to pass through it, but in doing so causing a significant voltage drop and the generation of appreciable heat. However, by actively driving the gate of the FET with the output of the switch controller, the FET can be actively driven during the charging operation to operate as a low impedance switch in its on state.

There are a number of ways in which the switch controller can be arranged to determine the direction of current flow. However, in one embodiment, the switch controller determines the direction of current flow by monitoring a voltage drop across the FET, and generates a voltage at its output sufficient to turn on the FET if the direction of current flow is in said first direction. This provides a simple and efficient mechanism for detecting the direction of current flow.

The switch controller can take a variety of forms but in one embodiment comprises an op-amp circuit. In one particular embodiment, positive and negative inputs of the op-amp circuit are connected across the FET via first and second resistor elements. Hence the voltage drop can be used to directly provide the inputs to the op-amp circuit. For example, considering a particular embodiment where the FET is an N-channel FET, in the presence of a charging current, this creates a positive bias on the positive input pin of the op-amp and a negative bias on the negative input pin of the op-amp, such that the output of the op-amp then goes to a high voltage level. Since the output of the op-amp is connected to the gate of the N-channel FET, this causes the FET to turn on, and when turned on the impedance of the FET is very low (preferably a few milli-ohms), removing the voltage drop of the diode and the associated high power dissipation.

As discussed previously, when the FET is turned off, the auxiliary current tripping element is connected into the current flow path. If that auxiliary current tripping element subsequently trips due to the current reaching the second predetermined level, this could cause a significant change in voltage as applied to the negative input of the op-amp, potentially damaging the op-amp. Accordingly, in one embodiment, the charger protection circuitry further comprises voltage limiting circuitry for limiting the voltage applied to the negative input of the op-amp under a condition that the FET is turned off and the auxiliary current tripping element has interrupted current flow. In one embodiment, this voltage limiting circuitry can take the form of a diode connected between the negative input of the op-amp and the other side of the FET to that which the negative input of the op-amp is connected to via its associated resistor.

The switch controller will require an operating voltage in order to operate, and in one embodiment the operating voltage is derived from the supply voltage of the charger protection circuitry. In particular, in one embodiment the charger protection circuitry comprises voltage regulator circuitry for producing an operating voltage for the switch controller from a supply voltage of the charger protection circuitry. In one particular embodiment, this voltage regulator circuitry is coupled between the positive supply line and negative supply line running through the charger protection circuitry, in order to produce an operating voltage for the switch controller that is between the voltage of the positive and negative supply lines.

As mentioned previously, in one embodiment the switch controller is arranged to turn off the switch element if there is no current flowing through the charger protection circuitry. In one particular embodiment, this is achieved by using the voltage regulator circuitry to provide a bias voltage to the negative input of the op-amp to ensure that the output of the op-amp is not sufficient to turn on the switch element if no current is flowing through the charge protection circuitry.

The charger protection circuitry typically includes a positive supply line for coupling to the positive terminal of the battery and a negative supply line for coupling to the negative terminal of the battery. There are a number of ways in which the main current tripping element and the switch element/auxiliary current tripping element can be connected to these lines, and in principle either of these elements can be connected to either of the lines. However, it is typically the case that the main current tripping element will be connected to the positive supply line. In one embodiment, the switch element is also connected to the positive supply line, such that when the switch element is turned off the auxiliary current tripping element is connected into the positive supply line. In one such embodiment, the switch element comprises a P channel field effect transistor (FET) whose gate is connected to an output of the switch controller. By using a P channel FET in such embodiments, it is possible to produce a drive voltage for the gate of the FET that lies between the voltage of the positive and negative supply lines, hence readily being derived from a simple voltage regulator circuit.

In one embodiment, whilst the main current tripping element is connected to the positive supply line, the switch element is connected to the negative supply line, so that when the switch element is turned off the auxiliary current tripping element is connected into the negative supply line. In one such embodiment, the switch element comprises an N channel field effect transistor (FET) whose gate is connected to an output of the switch controller. In such a configuration, the use of an N channel FET ensures that the gate of that FET can be driven by a voltage that is between the voltage of the two supply lines, again allowing that voltage to be created by a simple voltage regulator circuit. Further, N channel FETs are typically cheaper than P channel FETs, and accordingly such a configuration will often allow for a cheaper charger protection circuitry to be developed.

Provided that any short envisaged is only likely to occur between the positive supply line and the negative supply line of the charger cable, then it is only necessary to provide one switch element/auxiliary current tripping element combination in either the positive supply line or the negative supply line, and this will be sufficient to ensure that the output current is inhibited if it exceeds an expected level. However, for additional robustness, for example to allow for situations where either one of the positive or negative supply lines shorts with a separate wire elsewhere within the device, in one embodiment the switch element and associated auxiliary current tripping element may be provided in both the positive supply line and the negative supply line. Typically, in such embodiments, each will be provided with its own separate switch controller, although it may be possible in certain embodiments to reuse certain elements of the switch controller for both switches.

The current tripping elements used in embodiments of the present invention may take a variety of forms, for example fuses, circuit breakers, etc. In one embodiment, at least one of the main current tripping element and the auxiliary current tripping element comprise one or more fuses. In one embodiment either or both of the main current tripping element and the auxiliary current tripping element comprise at least one self-resetting fuse. In one particular embodiment, each self-resetting fuse is a solid state self-resetting fuse, these having been found to provide a particularly reliable embodiment of the main and auxiliary tripping elements.

As mentioned previously, in some embodiments of the present invention, the charger cable will be shared with one or more modules which will need to draw output current in order to power those modules. Accordingly, in one embodiment, said second predetermined level of current associated with the auxiliary current tripping element is such as to allow output current to flow in said second direction sufficient to power a module connected between the charger and the charger protection circuitry.

The charger protection circuitry of embodiments of the present invention may be used in a variety of devices containing rechargeable batteries. However, in one particular embodiment, a motorised vehicle powered by a rechargeable battery is arranged to include charger protection circuitry in accordance with embodiments of the present invention.

Viewed from a further aspect, the present invention provides a method of protecting a charger cable used for charging of a rechargeable battery, by coupling charger protection circuitry between the rechargeable battery and a battery charger, during a charging operation of the battery charge current being arranged to flow through the charger protection circuitry in a first direction, the charger protection circuitry comprising a main current tripping element for interrupting current flow if the current reaches a first predetermined level, a switch element, and an auxiliary current tripping element connected in parallel with the switch element for interrupting current flow if the current reaches a second predetermined level lower than the first predetermined level, the method comprising the steps of: if current is flowing in said first direction turning on the switch element such that said auxiliary current tripping element is bypassed, whereby the main current tripping element controls interruption of current flow; and if current is flowing in a second direction opposite to said first direction, turning off the switch element, whereby the auxiliary current tripping element controls interruption of current flow. Such a technique protects the charger cable during both charging and normal operation.

BRIEF DESCRIPTION OF THE DRAWINGS

The present invention will be described further, by way of example only, with reference to embodiments thereof as illustrated in the accompanying drawings, in which.

DESCRIPTION OF EMBODIMENTS

Figure 1:
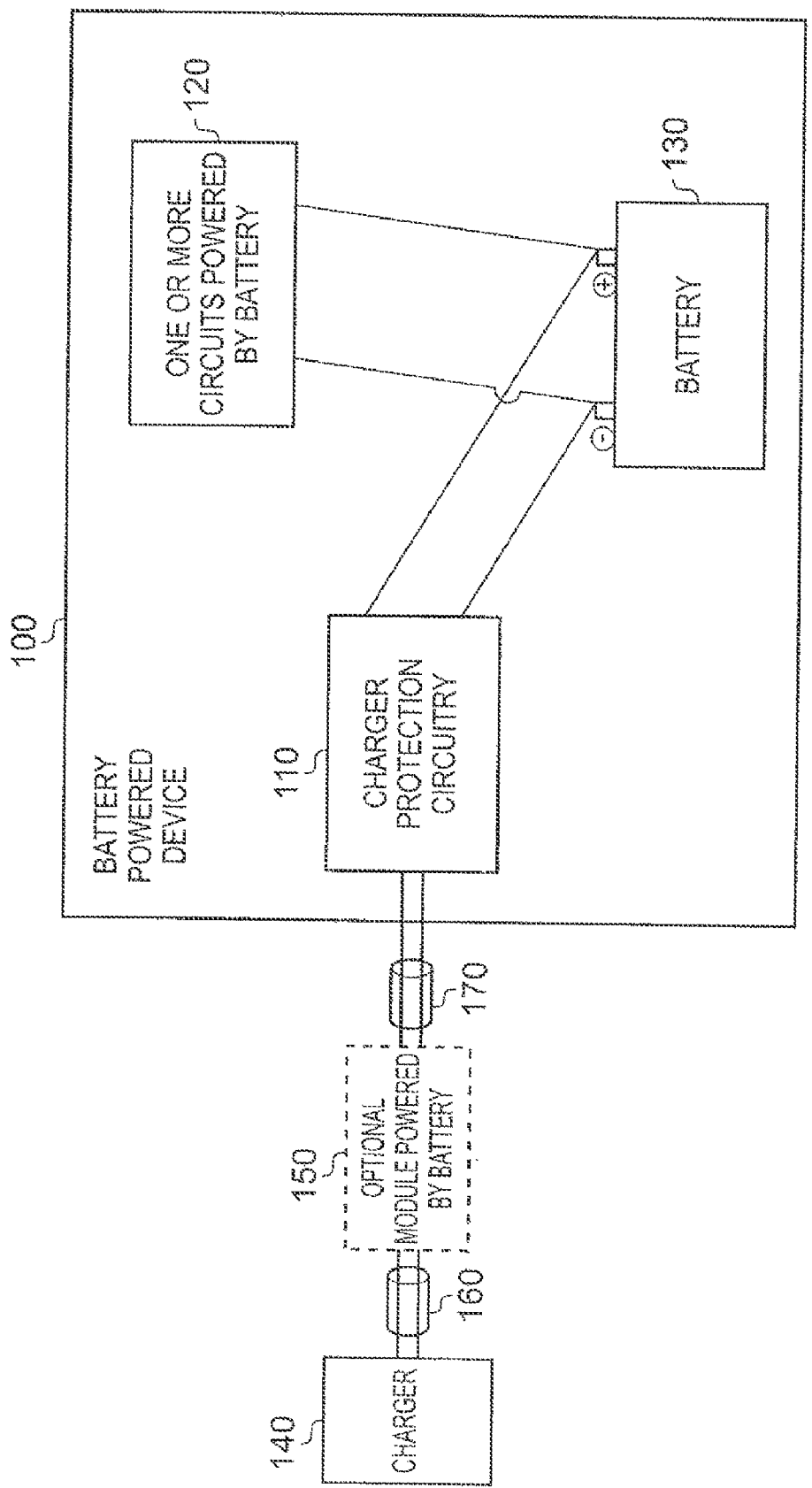
FIG. 1 is a diagram schematically illustrating a battery powered device in which charger protection circuitry of embodiments of the present invention may be used.

FIG. 1 is a block diagram schematically illustrating a battery powered device in which charger protection circuitry in accordance with an embodiment of the present invention may be utilised. The battery powered device 100 incorporates a rechargeable battery 130 that is used to power one or more circuits 120. To recharge the battery 130, a charger 140 and associated charging lead 160 is coupled to the device 100, and in particular to charger protection circuitry 110 which is coupled with the battery 130 (either by being directly connected to the battery or via some intervening circuitry). In one embodiment, the charger and associated charging lead 160 may be connected directly to the charger protection circuitry 110 via a connection point on the housing of the battery powered device 100. However, alternatively a lead 170 may run from the battery powered device 100 to an optional module 150 which receives its power from the rechargeable battery 130 via the lead 170. In such embodiments, it may be the case that the charger connection point is provided on the optional module 150, such that the charger lead 160 from the charger is connected to the optional module 150, with the cable 170 then serving the dual purpose of enabling charge current to be routed to the battery 130 via the charger protection circuitry 110, and also allowing power to be provided from the battery to the optional module 150. In such embodiments the cables 160 and 170 collectively form the "charger cable" as that term is used herein.

It should be noted that in embodiments where a module 150 is provided, it is not a requirement that the charger connection point is provided on the module, and instead the charger and associated cable 160 may be directly connected to a charger connection point on the battery powered device 100, which then connects to the charger protection circuitry 110. In that instance, there is still benefit in routing the cable 170 associated with module 150 via the charger protection circuitry 110, particularly if the cable 170 is, by virtue of its location, potentially vulnerable to damage.

Whilst the battery powered device can take a variety of forms, in one embodiment of the present invention the battery powered device is an electric vehicle such an electric scooter or an electric wheelchair.

Figure 2:
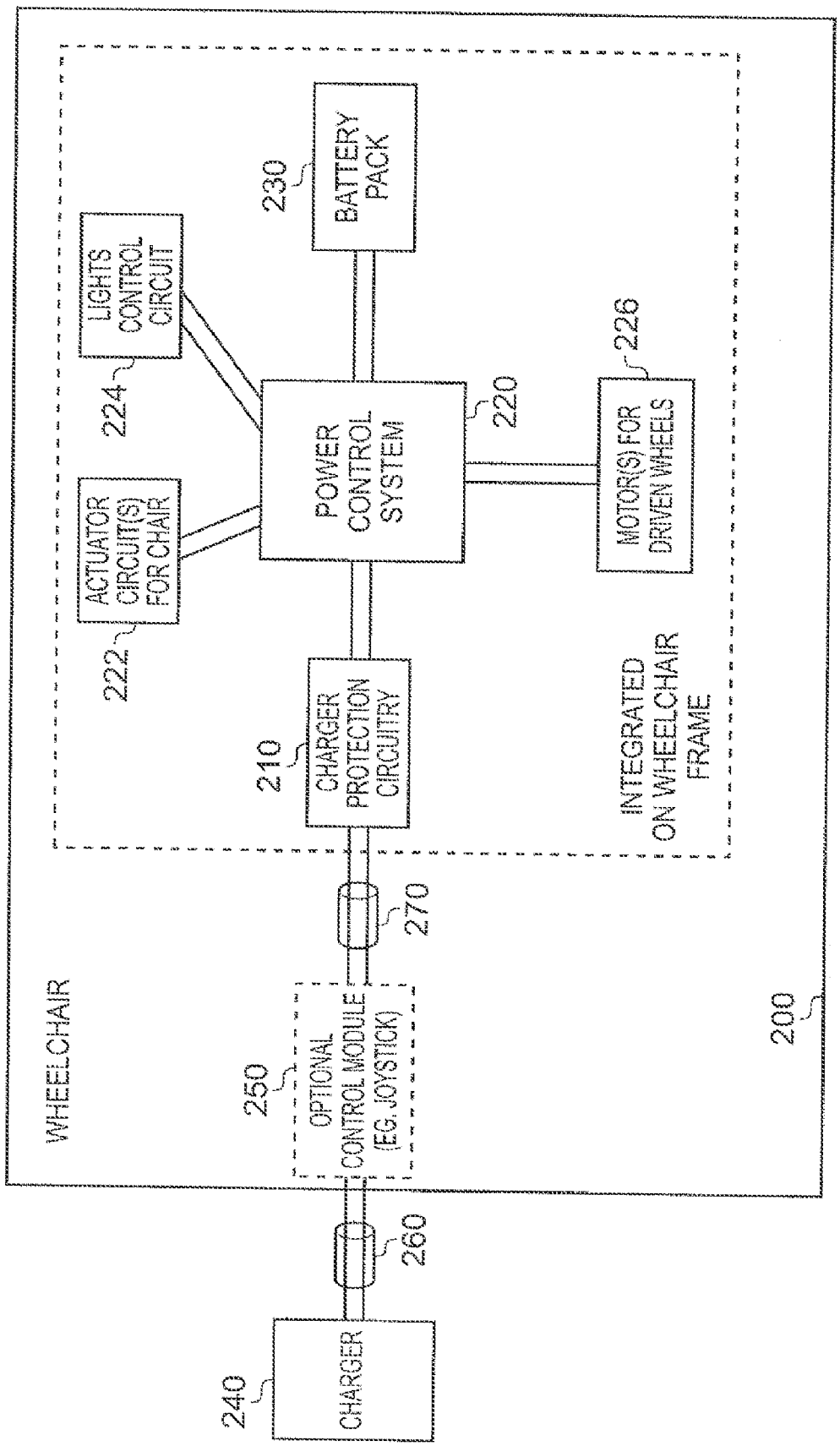
FIG. 2 is a diagram schematically illustrating a wheelchair in which charger protection circuitry of embodiments of the present invention may be used.

FIG. 2 schematically illustrates some of the electrical components that may be provided within such an electric vehicle, in this example the electric vehicle being a wheelchair 200. Within the wheelchair, a power control system 220 is often used to control the distribution of power from the battery pack 230 to a variety of circuits. For example, one or more actuator circuits 222 may be provided for electrical control of the chair upon which a user sits. Similarly, circuits 224 may be used to control the lights on the wheelchair. Further, one or more motors 226 will be provided for driving the wheels of the wheelchair, often separate motors being provided for the left and right driven wheels of the wheelchair.

In accordance with one embodiment of the present invention, charger protection circuitry 210 is also coupled to the power control system, and is arranged to be coupled to a charger 240 via its associated charging lead 260. In one embodiment, the lead 260 may be connected to a charger connection point which is then directly connected to the charger protection circuitry 210. However, in an alternative embodiment, the charger connection point may be provided on an optional control module 250, which in the example of a wheelchair may take the form of a joystick module employed by the user to control the operation of the wheelchair. A module extension cable 270 may then be provided from the charger protection circuitry 210 to the optional control module 250 to provide a common power line used both for passing charge current from the charger to the battery pack during a charging operation, and also for providing output current from the battery pack to the optional control module 250 to power the control module. In such embodiments the cables 260 and 270 collectively form the "charger cable" as that term is used herein.

As will be understood by those skilled in the art, the direction of the charging current during the charging operation will be opposite to the direction of the output current provided from the battery pack to the control module. It is also worth noting that even in the absence of the control module 250, it may still be required to allow output current from the battery to the charger 240 via the charger protection circuitry 210, for example to enable the charger to assess the current battery voltage. One purpose of the charger protection circuitry 210 is to allow the required charging current to pass in a first direction from the charger 240 to the power control system 220 and from there to the battery pack 230, whilst protecting against any surges in current that exceed the expected charging current. In addition, the charger protection circuitry 210 is arranged to enable a lower output current to pass from the battery pack 230 via the charger protection circuitry 210 as required by the charger 240 or the optional control module 250, but to prevent that output current exceeding that required by the charger or optional control module. In particular, the charger protection circuitry is arranged to prevent current being drawn by a self-sustaining arc caused by damage to either the cable 260 or the cable 270, when that current is at a level where it would not cause any protection fuses provided for the charging current to trip. Further the charger protection circuitry reduces the risk of an arc forming in the first place. The charger protection circuitry provides effective protection against such events in any part of the charger cable running between the charger protection circuitry and the charger, i.e. the cables 160, 170 in FIG. 1 or the cables 260, 270 in FIG. 2.

Figure 3:
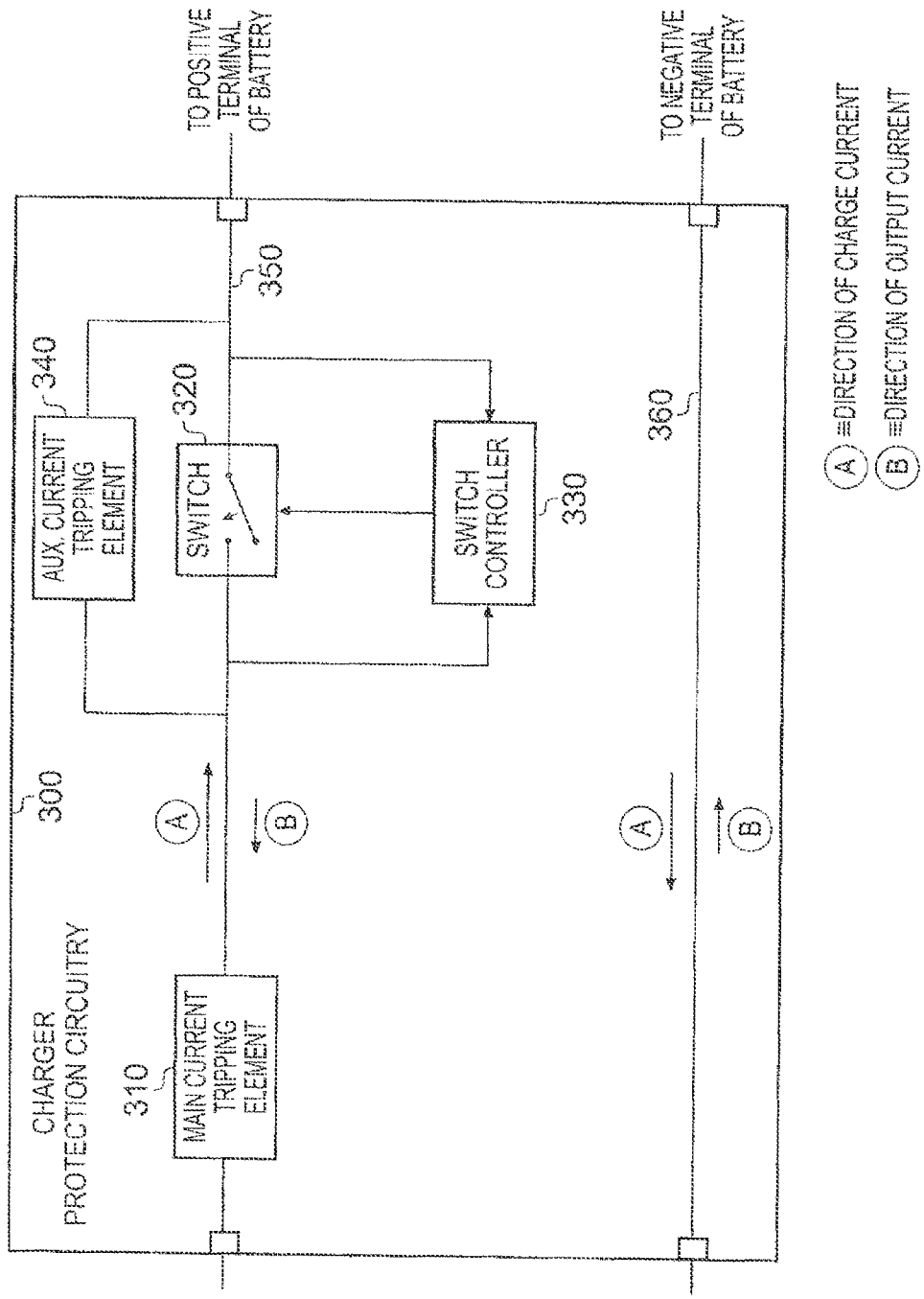
FIG. 3 illustrates the main components provided within the charger protection circuitry in accordance with one embodiment of the present invention.

FIG. 3 schematically illustrates the main components provided within the charger protection circuitry in accordance with one embodiment of the present invention. As shown in FIG. 3, the cable connected to the charger protection circuitry provides a positive supply line 350 for coupling to the positive terminal of the battery (either via direct connection to the charger protection circuitry or via some intermediate unit) and also provides a negative supply line 360 for coupling in a similar manner to the negative terminal of the battery. In the embodiment shown in FIG. 3, a main current tripping element 310 is provided within the positive supply line, in one embodiment this main current tripping element being formed by one or more solid-state self-resetting fuses. The current rating of these fuses is chosen so as to allow the required currents that occur during a charging operation to pass through the charger protection circuitry without blowing the fuses. As an example, considering the particular example of an electric wheelchair, the current tripping element may have a current rating of about 12 amps.

In the embodiment shown in FIG. 3, a switch element 320 is also provided in the positive supply line, and has an auxiliary current tripping element 340 provided in parallel therewith. A switch controller 330 is used to drive the switch element 320 and is arranged to determine whether to turn the switch on or off in dependence on a direction of current flow through the charger protection circuitry. In particular, as shown in FIG. 3, the direction of charge current during a charging operation is shown by the arrows A, i.e. passing from left to right along the positive supply line 350 towards the battery, and then from right to left along the negative supply line 360 away from the battery. From analysing the voltage on either side of the switch element 320, the switch controller 330 can detect the direction of current flow, and in the event that the current is flowing in the direction A, turns the switch 320 on (i.e. closes the switch) so as to bypass the auxiliary current tripping element 340.

As also shown in FIG. 3, the direction of output current drawn by the charger 240 or any optional control module 250 is in the direction shown by the arrows B in FIG. 3, namely passing from left to right along the negative supply line 360 towards the battery and passing from right to left along the positive supply line 350 away from the battery. Again, from detecting the voltage difference across the switch 320, the switch controller 330 can detect when the direction of current flow is in the direction B, and on detection of such current is arranged to turn the switch off (i.e. open the switch), thereby placing the auxiliary current tripping element 340 within the current flow path.

Accordingly, it will be appreciated that by such an approach, during charging operations, the main current tripping element 310 is used to control any interruption in current flow, in particular the main current tripping element 310 breaking the current flow if the current exceeds the current rating of the main current tripping element.

However, when output current is being drawn in the opposite direction, the auxiliary current tripping element 340 is the element that effectively controls any interruption of the current. The auxiliary current tripping element 340 is in one embodiment formed from solid-state self-resetting fuses, and is chosen to have a current rating significantly less than that of the main current tripping element 310. Hence, current flow is more readily interrupted when flowing in direction B, thereby protecting against any illegitimate drawing of output current, such as may occur when a self-sustaining arc has developed in the charger cable due to damage to the cable.

Figure 4:
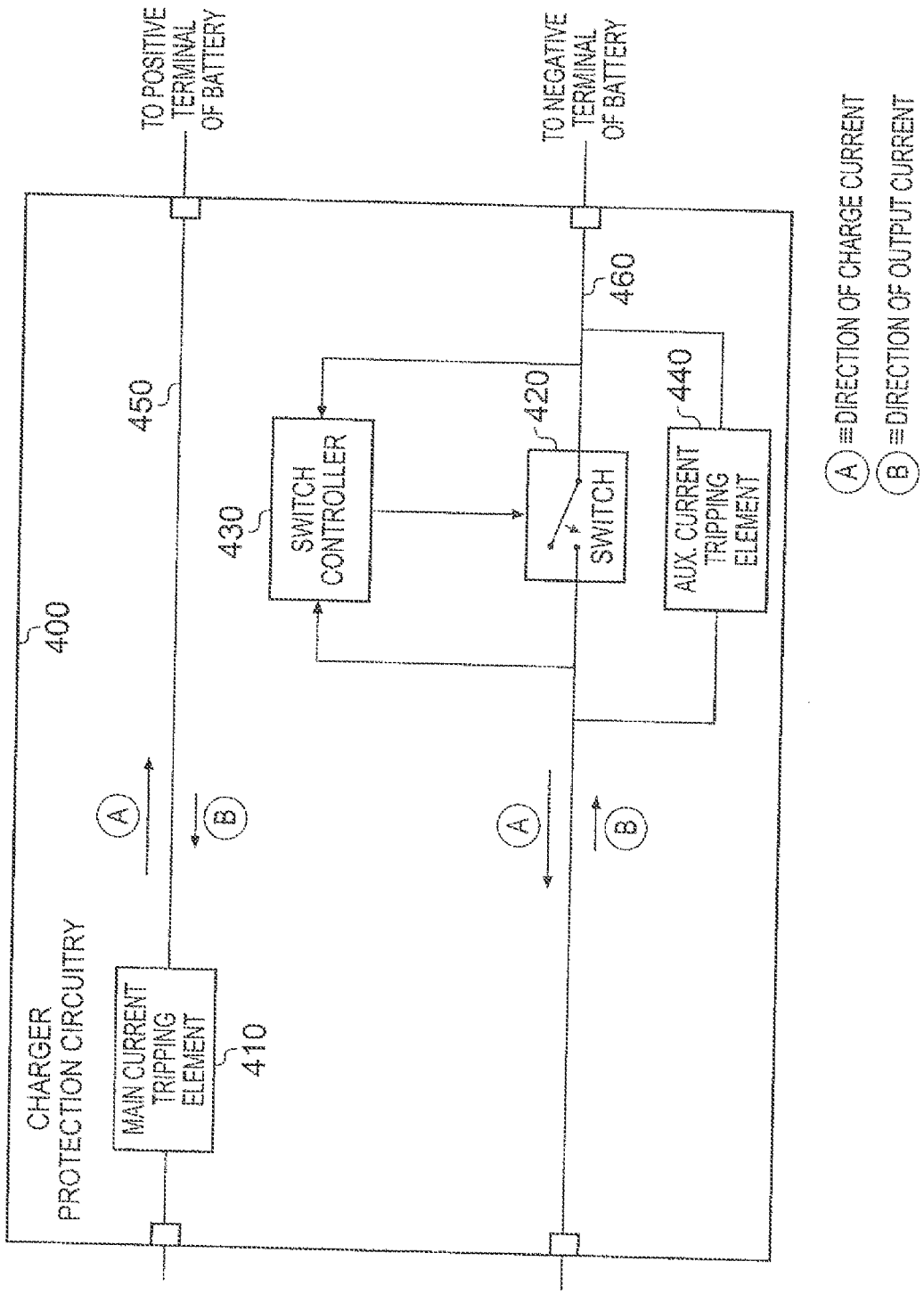
FIG. 4 illustrates the main components provided within the charger protection circuitry in accordance with another embodiment of the present invention.

FIG. 4 illustrates an alternative embodiment to the charger protection circuitry of FIG. 3. As can be seen, the embodiment of FIG. 4 includes all the same elements as those shown in FIG. 3, and those elements operate in the same manner as described earlier with reference to FIG. 3. However, in this embodiment, the switch element 420 is placed within the negative supply line 460 and hence when the switch is turned off the auxiliary current tripping element 440 is placed in the path of the negative supply line. It is worth noting that the switch and associated auxiliary current tripping element provide the same functionality irrespective of whether they are provided in the positive supply line or the negative supply line. However, when placed in the negative supply line, it is possible to use components that are generally cheaper than those that would be required to provide the equivalent functionality in the positive supply line. In particular, the switch 420 can be embodied by an N channel FET when placed in the negative supply line 460, whereas the switch 320 when provided in the positive supply line will typically be embodied by a P channel FET. Although it would in principle be possible to use an N channel FET for the switch 320, this would add complexity to the switch controller 330, due to the need to generate an appropriate control voltage for controlling the switch.

It should also be noted that whilst in both of the embodiments of FIGS. 3 and 4 the main current tripping element 310, 410 is provided within the positive supply line, it may in some embodiments be placed within the negative supply line.

It is also worth noting that, in some embodiments, it would be possible to provide the switch and associated auxiliary current tripping element in both the positive supply line and the negative supply line in order to provide enhanced protection against other possible wiring faults. For example, if a short occurs between the positive supply line and the negative supply line of the charger cable, then it is only necessary to have one switch and associated auxiliary current tripping element. However, if it is possible that one of those supply lines could short against some entirely separate wiring in the device, then the duplication of the switch and auxiliary current tripping element in both of the positive and negative supply lines can provide protection against such scenarios.

Figure 5:
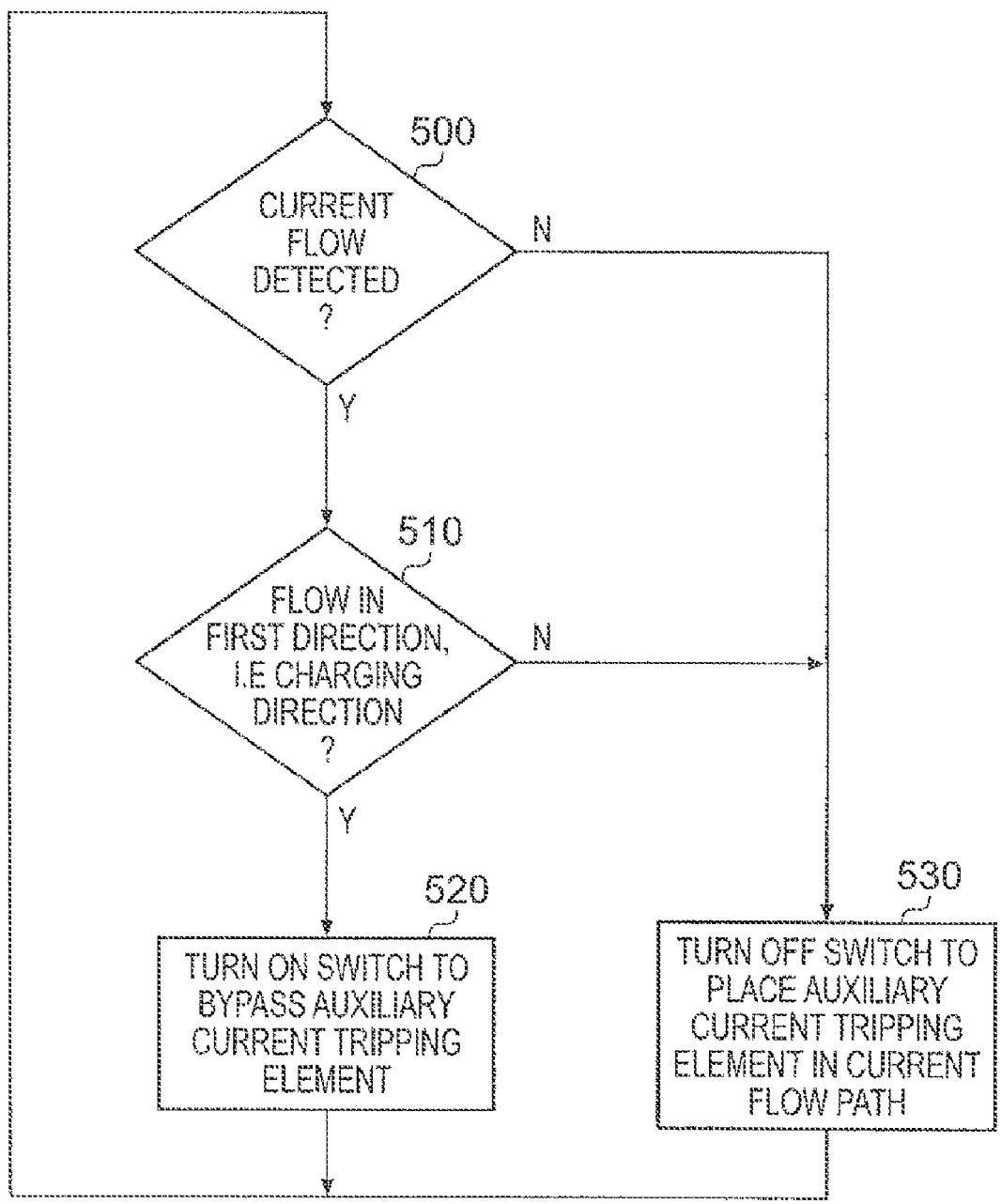
FIG. 5 is a flow diagram illustrating the operation of the switch controller shown in FIG. 3 or FIG. 4 in accordance with one embodiment of the present invention.

FIG. 5 is a flow diagram schematically illustrating the operation of the switch controller 330, 430 shown in FIGS. 3 and 4. At step 500, the switch controller determines whether any current is flowing, and if so the process proceeds to step 510, where it is determined whether the current flow is a first direction, i.e. in the charging direction A. If the current flow is in the first direction, then the switch is turned on at step 520 in order to bypass the auxiliary current tripping element. However, if at step 510 it is determined that the flow is not in the first direction, i.e. it is instead in the output current direction B, then the process proceeds to step 530, where the switch is turned off to place the auxiliary current tripping element in the current flow path.

In addition, in one embodiment of the present invention, if no current flow is detected at all, i.e. the "no" branch is followed from step 500, this will also cause the switch to be turned off at step 530. This provides an additional safety measure by ensuring that if any sudden current is drawn, tripping of the current will be governed by the auxiliary current tripping element, this having a significantly reduced current rating when compared with the main current tripping element.

Figure 6:
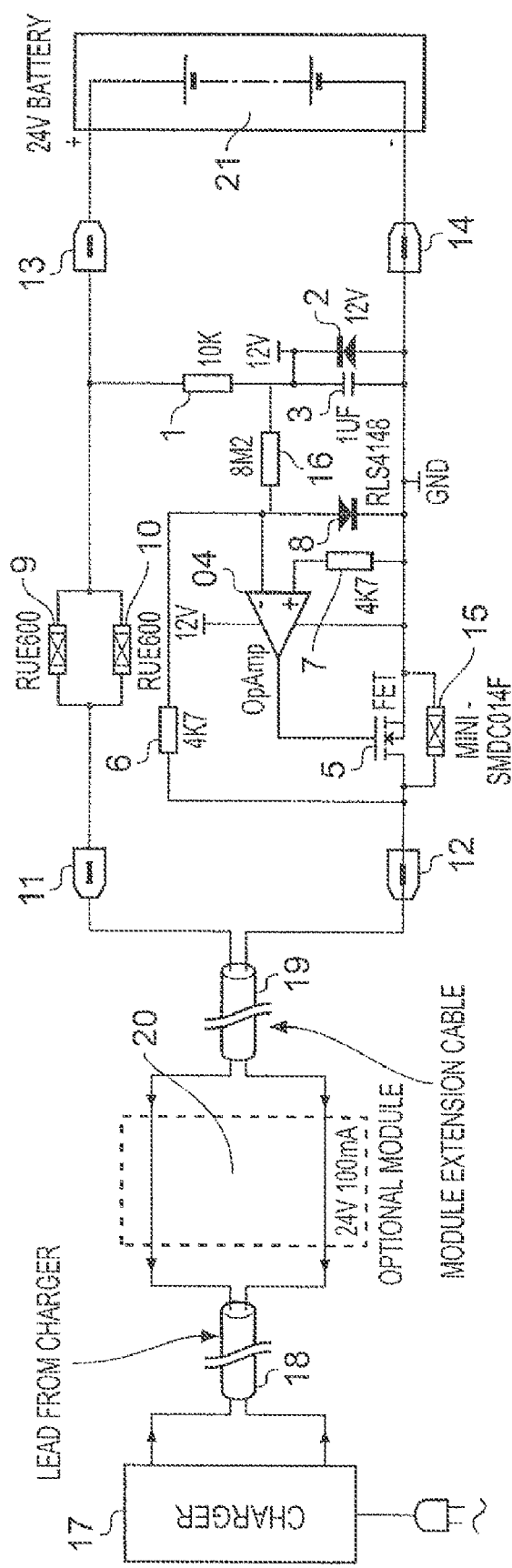
FIG. 6 is a circuit diagram illustrating in detail the components provided within the charger protection circuitry in order to implement the arrangement of FIG. 4 in accordance with one particular embodiment of the present invention.

FIG. 6 illustrates the charger protection circuitry of one particular embodiment of the present invention, implementing the configuration of FIG. 4. The circuit values shown are optimised for a 24 Volt system. The circuit is interposed between the battery charger 17 and the battery 21. The vulnerable charger lead 18 and module extension cable 19 (collectively constituting the "charger cable" as that term is used herein) are connected to the charger connections 11 and 12 of the charger protection circuitry.

The resistor 1, zener diode 2 and capacitor 3 form a low cost, low current drain, 12 volt regulator that supplies op-amp 4, the op-amp 4 forming the switch controller 430 of FIG. 4. Alternatively the 12 volt supply could be obtained from a commonly available voltage regulator device.

When the battery charger is connected to the battery then current will flow from the charger connector terminal 11 through self-resetting solid-state fuses 9 and 10 collectively forming the main current tripping element 410 of FIG. 4 (typically rated at 6 amps each), and into the battery via battery connection 13. The return current flows from battery connection 14 through N channel FET 5, FET 5 forming the switch element 420 of FIG. 4. Within the FET is a parasitic diode that will normally pass this current, however this diode, as mentioned previously, will cause a large voltage drop and appreciable heat. In order to prevent this, the inputs to op-amp 4 are connected across the FET via resistors 6 and 7. The charging current creates a positive bias on the positive input pin of the op-amp and a negative bias on the negative input pin of the op-amp. Therefore, the output of the op-amp 4 goes high (typically 10.5V). The output of the op-amp is connected to the gate of the N channel FET 5 that is thus switched into the on state. The impedance of the FET when switched on is very low (preferably a few milli-ohms) removing the voltage drop of the diode and the associated high power dissipation. The self-resetting solid-state fuses 9 and 10 provide protection from excess battery charging currents. For lower current systems (e.g. 5 amps) only one self-resetting solid-state fuse is required.

When a small current is taken from the battery the current creates a negative bias on the positive input pin of the op-amp and a positive bias on the negative input pin of the op-amp. Therefore, the output of the op-amp 4 goes low (typically <0.5V). The output of the op-amp is connected to the gate of the N channel FET 5 that is thus now switched into the off state. Hence the current now flows through the self-resetting solid-state fuse 15, this forming the auxiliary current tripping element 440 of FIG. 4. Fuse 15 has a low continuous current rating (typically 500 mA) and a very low thermal mass compared to fuses 9 and 10. If excess current is drawn from the battery charger connections 11 and 12, the self-resetting solid-state fuse 15 will trip. The low continuous current rating and low thermal mass of fuse 15 mean that if the charger cable is short-circuited the possibility of producing damaging currents or arcing is eliminated. The low current available is adequate for powering the optional (control) module 20, for example a joystick employed by the user of a wheelchair in an embodiment where the charger protection circuitry is deployed in an electric wheelchair.

Diode 8 limits the voltage applied to the negative pin of op-amp 4 when FET 5 is off and fuse 15 has triggered.

Resistor 16 can be included in order to provide a very small bias voltage (e.g. 5 mV) on the negative input of op-amp 4. This bias ensures that the output of op-amp 4 is low when there is no current passing through the circuit. This small bias voltage can also be achieved by omitting both resistors 7 and 16 from the design, since the inputs of op-amp 4 naturally provide a positive bias current, which means that the negative input can be biased positive through use of the resistor 6 by itself.

Although in FIG. 6 the battery 21 is shown directly connected to terminals 13, 14 of the charger protection circuitry, it will be appreciated that this is not a requirement, and indeed often there will be one or more intervening units such as the power control system 220 between the terminals 13, 14 and the battery 21. However, the operation of the charger protection circuitry is as discussed above irrespective of whether the charger protection circuitry is directly connected to the battery, or coupled to the battery via one or more intervening units.

From the above description, it will be appreciated that embodiments of the present invention provide a low impedance switch that allows positive charging current to pass with minimal voltage drop and heat dissipation losses, but which allows only limited output current to flow in the opposite direction as required by the charger, any optional control modules, etc. By limiting the output current and power, this protects against cable shorts and eliminates potential cable fires that are the result of intermittent or partial shorting.

In the example circuit discussed with reference to FIG. 6, the circuit is designed using low cost parts, in order to maximise the utility of the circuit. The switch is embodied by an N channel FET device and the switch controller can be embodied by an op-amp that is a very common ground sensing op-amp. In one embodiment of the circuit, simple self-resetting fuses are used. However, more complex solid-state versions could be used or even simple non-resetting fuses could be used if desired.

Although a particular embodiment has been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

We claim:

1. Charger protection circuitry for a rechargeable battery, the charger protection circuitry for coupling between the rechargeable battery and a battery charger, during a charging operation of the battery charge current being arranged to flow through the charger protection circuitry in a first direction, the charger protection circuitry comprising:
   a main current tripping element for interrupting current flow if the current reaches a first predetermined level;
   a switch element;
   an auxiliary current tripping element connected in parallel with the switch element and operable independently of the main current tripping element to interrupt current flow if the current reaches a second predetermined level lower than the first predetermined level; and
   a switch controller for turning the switch element on and off in dependence on a direction of current flow through the charger protection circuitry;
   if current is flowing in said first direction the switch controller being arranged to turn on the switch element such that said auxiliary current tripping element is bypassed and hence not used to control interruption of current flow, such that the main current tripping element controls interruption of current flow in dependence on whether the current flowing in said first direction reaches said first predetermined level; and
   if current is flowing in a second direction opposite to said first direction the switch controller being arranged to turn off the switch element, such that the auxiliary current tripping element is used to control interruption of current flow in dependence on whether the current flowing in said second direction reaches said second predetermined level.

2. Charger protection circuitry as claimed in claim 1, wherein if no current is flowing through the charger protection circuitry, the switch controller is arranged to turn off the switch element.

3. Charger protection circuitry as claimed in claim 1, wherein the switch element comprises a field effect transistor (FET) whose gate is connected to an output of the switch controller.

4. Charger protection circuitry as claimed in claim 3, wherein the switch controller determines the direction of current flow by monitoring a voltage drop across the FET, and generates a voltage at its output sufficient to turn on the FET if the direction of current flow is in said first direction.

5. Charger protection circuitry as claimed in claim 3, wherein the switch controller comprises an op-amp circuit.

6. Charger protection circuitry as claimed in claim 5, wherein positive and negative inputs of the op-amp circuit are connected across the FET via first and second resistor elements.

7. Charger protection circuitry as claimed in claim 6, further comprising voltage limiting circuitry for limiting the voltage applied to the negative input of the op-amp under a condition that the FET is turned off and the auxiliary current tripping element has interrupted current flow.

8. Charger protection circuitry as claimed in claim 1, further comprising voltage regulator circuitry for producing an operating voltage for the switch controller from a supply voltage of the charger protection circuitry.

9. Charger protection circuitry as claimed in claim 6, further comprising voltage regulator circuitry for producing an operating voltage for the switch controller from a supply voltage of the charger protection circuitry, wherein an output of the voltage regulator circuitry is arranged to provide a bias voltage to the negative input of the op-amp to ensure that the output of the op-amp is not sufficient to turn on the switch element if no current is flowing through the charge protection circuitry.

10. Charger protection circuitry as claimed in claim 1, wherein the charger protection circuitry includes a positive supply line for coupling to the positive terminal of the battery and a negative supply line for coupling to the negative terminal of the battery, the main current tripping element and the switch element being connected to the positive supply line.

11. Charger protection circuitry as claimed in claim 10, wherein the switch element comprises a P channel field effect transistor (FET) whose gate is connected to an output of the switch controller.

12. Charger protection circuitry as claimed in claim 1, wherein the charger protection circuitry includes a positive supply line for coupling to the positive terminal of the battery and a negative supply line for coupling to the negative terminal of the battery, the main current tripping element being connected to the positive supply line and the switch element being connected to the negative supply line.

13. Charger protection circuitry as claimed in claim 12, wherein the switch element comprises an N channel field effect transistor (FET) whose gate is connected to an output of the switch controller.

14. Charger protection circuitry as claimed in claim 1, wherein at least one of the main current tripping element and the auxiliary current tripping element comprise one or more fuses.

15. Charger protection circuitry as claimed in claim 14, wherein the main current tripping element comprises at least one self-resetting fuse.

16. Charger protection circuitry as claimed in claim 14, wherein the auxiliary current tripping element comprises at least one self-resetting fuse.

17. Charger protection circuitry as claimed in claim 15, wherein each self-resetting fuse is a solid state self-resetting fuse.

18. Charger protection circuitry as claimed in claim 1, wherein said second predetermined level of current associated with the auxiliary current tripping element is such as to allow output current to flow in said second direction sufficient to power a module connected between the charger and the charger protection circuitry.

19. A motorized vehicle powered by a rechargeable battery, comprising:
a rechargeable battery and a battery charger;
charger protection circuitry for the rechargeable battery, the charger protection circuitry for coupling between the rechargeable battery and the battery charger, during a charging operation of the battery charge current being arranged to flow through the charger protection circuitry in a first direction, the charger protection circuitry comprising:
a main current tripping element for interrupting current flow if the current reaches a first predetermined level;
a switch element;
an auxiliary current tripping element connected in parallel with the switch element and operable independently of the main current tripping element to interrupt current flow if the current reaches a second predetermined level lower than the first predetermined level; and
a switch controller for turning the switch element on and off in dependence on a direction of current flow through the charger protection circuitry;
if current is flowing in said first direction the switch controller being arranged to turn on the switch element such that said auxiliary current tripping element is bypassed and hence not used to control interruption of current flow, such that the main current tripping element controls interruption of current flow in dependence on whether the current flowing in said first direction reaches said first predetermined level; and
if current is flowing in a second direction opposite to said first direction the switch controller being arranged to turn off the switch element, such that the auxiliary current tripping element is used to control interruption of current flow in dependence on whether the current flowing in said second direction reaches said second predetermined level.

20. A method of protecting a charger cable used for charging of a rechargeable battery, by coupling charger protection circuitry between the rechargeable battery and a battery charger, during a charging operation of the battery charge current being arranged to flow through the charger protection circuitry in a first direction, the charger protection circuitry comprising a main current tripping element for interrupting current flow if the current reaches a first predetermined level, a switch element, and an auxiliary current tripping element connected in parallel with the switch element and operable independently of the main current tripping element to interrupt current flow if the current reaches a second predetermined level lower than the first predetermined level, the method comprising the steps of:
if current is flowing in said first direction, turning on the switch element such that said auxiliary current tripping element is bypassed and hence not used to control interruption of current flow, such that the main current tripping element controls interruption of current flow in dependence on whether the current flowing in said first direction reaches said first predetermined level; and
if current is flowing in a second direction opposite to said first direction, turning off the switch element, such that the auxiliary current tripping element is used to control interruption of current flow in dependence on whether the current flowing in said second direction reaches said second predetermined level.

* * * * *